United States Patent [19]

Van Der Giessen

[11] 4,358,803
[45] Nov. 9, 1982

[54] ARRANGEMENT FOR CENTERING AN INFORMATION DISC

[75] Inventor: Van Der Giessen, The Hague, Netherlands

[73] Assignee: U.S. Philips Corporation, New York, N.Y.

[21] Appl. No.: 135,804

[22] Filed: Mar. 31, 1980

[30] Foreign Application Priority Data

Dec. 10, 1979 [NL] Netherlands ............... 7908859

[51] Int. Cl.³ .................................. G11B 25/04
[52] U.S. Cl. ................................ 360/99; 360/97
[58] Field of Search ........................... 360/97–99, 360/133, 135

[56] References Cited

U.S. PATENT DOCUMENTS 3,898,814  8/1975  Chou et al. ............... 360/99 X
4,125,883 11/1978  Rolph ....................... 360/99
4,171,531 10/1979  Grapes et al. ............. 360/99

OTHER PUBLICATIONS

IBM/TDB vol. 19, No. 6, Nov. '76, pp. 2202–2203, "Collet Mechanism *** " by Lightner.

Primary Examiner—John H. Wolff
Attorney, Agent, or Firm—Joseph P. Abate

[57] ABSTRACT

To permit the storage of large amounts of information on interchangeable rigid magnetic discs, the inner wall of a turntable recess and the inner wall of the disc central opening are accurately machined with tight dimensional tolerances, and a centering element cooperates with at least one of the inner walls via elastically deformable compensation means.

16 Claims, 14 Drawing Figures

ARRANGEMENT FOR CENTERING AN INFORMATION DISC

BACKGROUND OF THE INVENTION

The invention relates to a system or an arrangement for centering information discs. The system comprises drive units as well as interchangeable information discs which are adapted to be placed into the drive units and to be removed therefrom. The discs are each provided with a carrier and an information layer supported thereby, as well as a central opening which is defined by an inner wall, a centering device being provided for centering the information disc in each drive unit. The system comprises: a turntable rotatable about an axis of rotation, which turntable has a supporting surface for an information disc on one end, in which a recess is formed defined by an inner wall which is coaxial with the axis of rotation; a centering element which rotates with an information disc, the element including a central portion, elastic portions which extend at least substantially radially and, near the ends thereof, transverse portions adapted for engagement both with the inner wall of the central opening of the information disc and with the inner wall of the recess in the turntable, for centering the information disc on the turntable in response to elastic axial displacement of the central portion; as well as displacement means in the drive unit for axially displacing the central portion of the centering element.

Systems of the forementioned type (for example known from U.S. Pat. No. 4,125,883), using inexpensive, flexible information discs manufactured from magnetic foil, are employed in various fields of data processing. The information disc in accommodated in a special enclosure in the form of a square envelope which is formed with a slot via which one or more magnetic heads have access to the information disc and with a central opening which is larger than the central opening in the information disc itself, so that a portion of the information disc around its central opening is accessible from the exterior of the enclosure.

Drive units for such disc units are commercially available and have gained a certain popularity because of their small dimensions and comparatively low cost. They are for example used for the storage of data or programs for small computers and similar equipment, such as for example text processors. The flexible information disc is rotated inside its enclosure with a comparatively low speed, for example, 300 revolutions per minute. The centering quality of the information disc on the turntable is determined by the difference between the dia-meter of the central opening in the information disc and the diameter of the recess in the turntable. As a standard the information discs are formed with a central opening having a diameter which is slightly greater than that of the recess in the turntable. Deviations from this standard diameter, within a comparatively large tolerance range, are considered to be permissible. A certain eccentricity of the information disc on the turntable is therefore inevitable. However, for the relevant purpose, this is considered to be acceptable because the flexible information discs are not intended for those applications wherein very large amounts of data are to be packed very densely on the disc. Furthermore, the information discs have such a low mass that at the low rotational speed they produce such low centrifugal forces that the resulting eccentricity will not always be equal to the maximum possible eccentricity. The frictional forces occurring between the turntable and the information disc are sufficiently great to prevent shifting of the information disc under the influence of the centrifugal forces which are produced.

There has been a long felt need for arrangements which, similarly to the flexible information disc systems, have a broad field of application and furthermore have small dimensions, but which in addition are suitable for the storage and reproduction of substantially greater amounts of data. In such systems the requirements imposed upon the maximum permissible eccentricity of the information disc are more stringent. Thus, it is no longer possible to employ systems in which a maximum eccentricity of the information disc relative to the axis of rotation of the turntable can occur which is equal to the difference between the diameter of the central opening in the information disc and the recess in the turntable.

SUMMARY OF THE INVENTION

It is the object of the invention to provide a system of the type mentioned in the preamble, which system is suitable for the storage and the reproduction of substantially larger amounts of information on readily interchangeable information discs. The invention is characterized in that the information disc has a substantially rigid carrier; the inner wall of the central opening in the information disc has an accurate finish; and the centering element engages at least one of the two inner walls, namely, the inner wall of the central opening of the information disc and the inner wall of the central recess in the turntable, via elastically deformable compensation means for elastically compensating for differences in diameter through elastic radial deformation.

The invention is based on the recognition that in order to accomplish the desired object a combination of the three aforementioned elements is necessary. By the use of a rigid information disc, it has become possible to exert pressure forces on the inner wall of the central opening of the information disc for the purpose of centering the disc. This is not practical in the case of flexible information discs. It is also necessary that the central opening in the disc have a good quality finish and the centering element may, for example, form a unitary centering. This means that the tolerance range for permissible differences in diameter can be reduced. Because neither the central opening in the information disc nor the recess in the turntable can be manufactured with absolute accuracy, slight dimensional variations will occur, even in the case of tight tolerance ranges. However, by the use of elastically deformable compensation means, the slight differences in diameter can be compensated for elastically. These elastically deformable compensation means can be integrally manufactured from an elastic material with a comparatively high modulus of elasticity, so that when sufficiently high pressure is exerted, they are capable of compensating for the differences in diameter and, moreover, capable of offering sufficient resistance to the centrifugal forces which are exerted on the information disc during rotation. Because rigid information discs generally will have a greater mass than flexible information discs, greater centrifugal forces will be produced.

In comparison with the prior art described in the foregoing, the invention not only provides a system for writing and/or reading information with a better centering of the information disc than in systems hitherto known, but also makes it possible to obtain systems with information carriers of higher quality. It is for example possible to employ information discs having an aluminium support, as is customary in known information disc assemblies used in peripheral apparatus for larger computers. Such information discs have a much flatter surface than the known flexible information discs. They are better suited for storage of larger amounts of information. The invention may also be employed in systems using optical information discs, for example, in a VLP system for the reproduction of films and the like via a television set or in optical storage systems as peripheral equipment for computers.

It is possible to employ an embodiment of the invention which is characterized in that the elastically deformable compensation means form part of an elastically deformable compensation ring. In a suitable embodiment of the invention, the ring is connected to the information disc and can thus be placed into and removed from the drive unit together with the disc. The advantage of this embodiment is that the accurately finished inner wall of the central opening in the information disc is protected by the elastically deformable compensation ring against damage. The information discs belonging to a system in accordance with the invention are interchangeable and should therefore be suitable for repeatedly being inserted into and removed from a drive unit. A further requirement is that they can withstand frequent handling and, as the case may be, prolonged storage. Thus, in the absence of some form of protection, it is not unlikely that the inner wall of the central opening of the information disc would be damaged. The adverse effects thereof may be of two different kinds. First damage to the inner wall may cause additional eccentricity of the information disc, because the material of the wall is displaced in a radial direction, so that a local projection is formed on the wall. Second, material of the inner wall may also be displaced in an axial direction over the information disc surface, so that near the central opening an unevenness is formed on the information disc surface. When the information disc is placed on a turntable this may give rise to an oblique position of the information disc, which position may impair the correct cooperation of a magnetic head or an optical head with the information disc.

Magnetic heads which are adapted to cooperate with rigid information discs of high quality move very close to the information disc surface, on an air cushion measuring approximately 2 microns. Contact of the magnetic head with the information disc surface is detrimental both to the magnetic head and to the information disc, which may both be damaged. This may give rise to loss of information and even irrepairable damage to the magnetic head and the magnetic information disc. By mounting the elastically deformable compensation ring on the information disc and thus protecting the inner wall of the central opening, the likelihood that said effects occur is reduced when the information disc has been removed from the drive unit.

In one embodiment of the invention the centering element may be connected to the elastically deformable compensation ring. The elastically deformable compensation ring and the centering element may, for example, form a unitary centering member, which is connected to the information disc and constitutes a unit which is manufactured from a suitable elastic plastics. In a further embodiment of the invention the central portion, the elastic portions of the centering element which extend at least substantially radially, as well as the elastic compensation ring constitute a centering disc, which is integrally made of an elastic plastics. Every information disc belonging to a system in accordance with this embodiment of the invention is centrally provided with such a centering disc, which may also be employed for marking purposes, in order to identify the information disc. Moreover, centering discs of different colors or other characteristic differences may be used. The drive unit for the system is simplified when this embodiment is used, because the complete centering element is contained in the information disc and therefore need not be provided on the drive unit. The drive unit cooperates with the centering disc of the information disc by means of the turntable and by means of the displacement device. The device moves the central portion of the centering disc when the information disc is placed onto the turntable.

An additional embodiment of the invention may be used which is characterized in that the centering disc substantially has the shape of a diaphragm, comprising an outer ring, a portion which is situated nearer the center, and a convoluted portion (convolution) which connects the outer ring to the portion situated nearer the center, the outer ring bearing on one of the sides of the information disc and the convolution extending through the central opening of said disc to the other side of the information disc and partly beyond said side; which convolution engages with the central opening of the information disc on its outer circumference, and the portion of the convolution which extends beyond the information disc functioning as the elastically deformable compensation ring of the centering disc. In order to prevent problems when such an information disc is placed on the turntable, an embodiment of the invention is characterized in that the centering disc and/or the turntable is (are) provided with at least one vent hole for venting the space inside the recess in the turntable when the information disc is in place.

For information discs which are to be placed on a turntable in a first position and in a reversed second position, for example, two-sided optical information discs which cooperate with a translating optical head on the deck of the drive unit, an embodiment of the invention is characterized in that the information disc is provided with two centering elements, one on each side of the information disc, each of the centering elements having slots between its substantially radially extending portions through which slots the substantially radially extending portions of the other centring element project. Preferably, the central portions of the two centering elements are coupled to each other by a coupling element. This prevents the loss of one or both centering elements.

It is alternatively possible to employ an embodiment of the invention which is characterized in that the centering element which rotates along with an information disc, in known manner, forms part of and is connected to the drive unit, and that the elastically deformable compensation ring is mounted on the outer circumference of the centering element. In this embodiment the centering element, similarly to the system disclosed in U.S. Pat. No. 4,125,883, is located in the drive unit and the elastically deformable compensation ring is mounted thereon. If necessary, the information discs belonging to a system in accordance with this embodiment of the invention may be provided with a different type of protection of the inner wall of the central opening, for example by accommodating each information disc in a suitable enclosure.

It is also possible to mount the elastic compensation ring on the turntable, against the inner wall of the central recess, instead of on the centering element.

Another embodiment of the invention is characterized in that the information disc is provided with a hub which is connected to the information-layer carrier, in which hub the central opening is formed, and that the inner wall of the central opening is provided with portions which define an annular space, the elastically deformable compensation ring being mounted in the annular space and extending radially inwardly beyond the inner wall of the central opening, at least when the information disc is not placed on the drive unit. The use of a hub is especially of interest in those systems in which the information-disc carrier is not adapted to be provided with a central opening whose inner wall directly cooperates with the centering element. This, for example, may occur when the information-disc carrier is thin or when the carrier consists of a material which is difficult to work or which is brittle. The hub can be made of any suitable material and be connected to the information disc carrier in a suitable manner, for example by glueing. The inner wall of the central opening of the information disc, which central opening is now formed in the hub, can now be formed so as to be exactly centered relative to the other parts of the information disc through a suitable operation.

As stated previously, if much information is to be stored on the information disc, not only an excellent centering of the information disc is required, but also steps which ensure that the information disc rotates in a plane which is exactly perpendicular to the axis of rotation. In this regard, an embodiment of the invention is of interest which is characterized in that, for supporting the information disc in the drive unit, the turntable makes direct contact with the information disc and thus directly supports said disc. By the use of existing manufacturing methods, it is readily possible to ensure that the supporting surface of the turntable, of course within the appropriate tolerances, is situated exactly at right angles to the axis of rotation. When such a precision-made turntable cooperates with a rigid high-quality information disc, it is found to be possible, as in systems in accordance with the invention employing interchageable magnetic information discs, to obtain such a high positional accuracy of the information surface of the information disc both in respect of its eccentricity and in respect of its perpendicularity to the axis of rotation, that advanced magnetic-head constructions may be used. The advanced magnetic heads float above the information surface at a distance of the order of magnitude of only 1 micron.

A further embodiment of the invention relates to a system in which, as is also described in U.S. Pat. No. 4,125,883, the drive unit comprises displacement means for axially moving the central portion of the centering element; which displacement means rotate along with an information disc. This embodiment is characterized in that the displacement means in the drive unit, for axially moving the central portion of the centering element which is connected to the information disc, as well as the said central portion of the centering element have mutually cooperating portions for centering the displacement means relative to the central portion and, therefore, also relative to the axis of rotation of the turntable.

A further embodiment is characterized in that the displacement means in the drive unit, for axially moving the central portion of the centering element, are coaxially connected to an information disc loader for urging the information disc against the turntable; the displacement means and the information disc loader being situated relative to each other in such a way that, upon an axial displacement the displacement means, when the information disc is in place, the displacement means first makes contact with the central portions of the centering element, subsequently move said element axially in such a way that the information disc is centered, and finally the information disc loader bears on the information disc in order to urge said disc against the turntable.

BRIEF DESCRIPTION OF THE DRAWINGS

The invention will now be described in more detail with reference to the drawings which relate to a number of embodiments, in which drawing.

DESCRIPTION OF THE PREFERRED EMBODIMENTS

Figure 1:
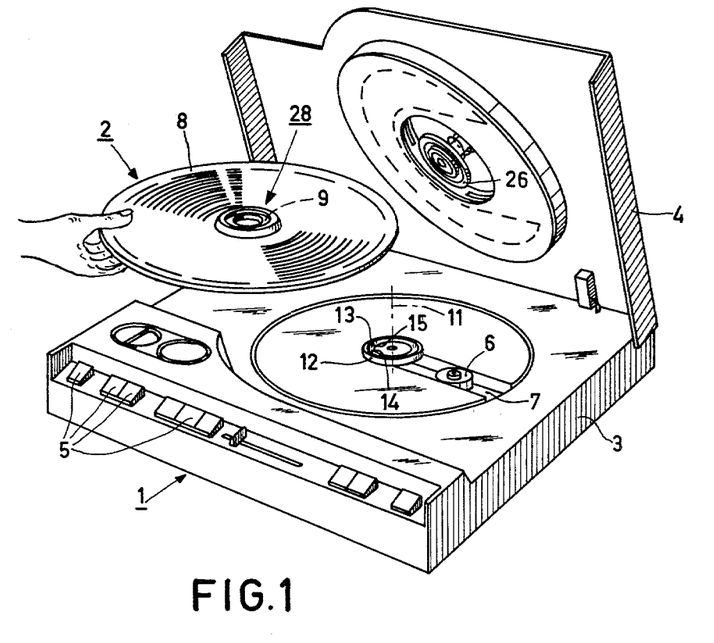
FIG. 1 is a perspective view of a system in accordance with the invention, comprising a video disc player and an associated interchageable video disc.

FIG. 1 shows a video disc player 1 with an associated video disc 2, together belonging to a standard system for reproducing video information. The video disc player comprises a base 3 to which a cover 4 is pivoted. At the front side of the base there are located a number of controls 5. In the base 3, an optical head 6 is radially movable in a slot 7. With the aid of the optical head 6, information can be read from the video disc 2. The video disc can manually be placed in the drive unit 1 and be removed therefrom and is thus interchangeable with other similar video discs and can also be played on other video disc players similar to that of FIG. 1. The video disc comprises a carrier 8 as well as an information layer which is extremely thin and therefore not shown. The video disc is formed with a central opening 9 defined by an inner wall 10.

Figure 2:
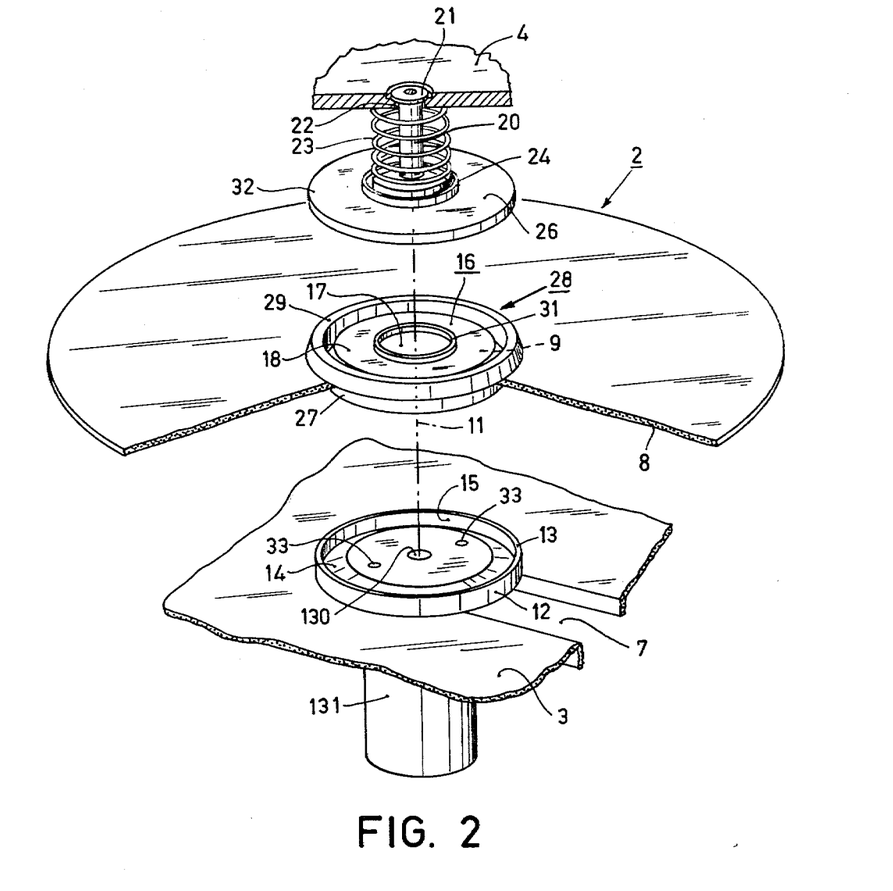
FIG. 2, is an exploded view and partly in cross-section, shows a number of parts of the system of FIG. 1 which are of importance for the invention.
Figure 3:
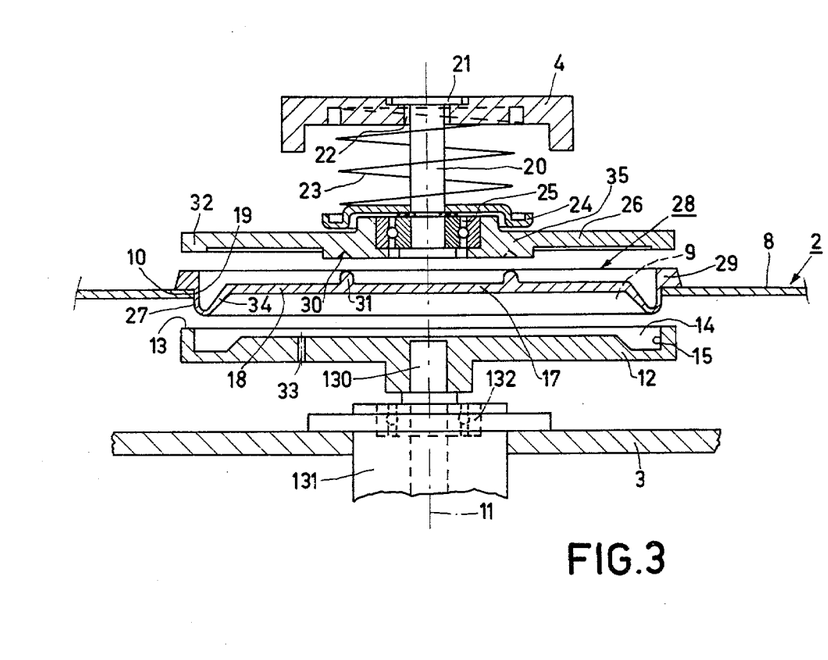
FIG. 3 is a cross-sectional view over the axis of rotation of the turntable of the system of FIG. 1, showing the turntable, a video disc, as well as an element, belonging to the video disc player, for centering or retaining the video disc in a relationship to each other as exists when the video disc is being inserted or removed.

A centering device for centering the video disc 2 in the video disc player 1 comprises a turntable 12, which is rotatable about an axis of rotation 11, which turntable has a supporting surface 13 for the video disc 2 on one end in which a recess 14 is formed defined by an inner wall 15 which is coaxial with the axis of rotation 11. Furthermore, as shown in FIG. 2, the device comprises a centering element 16, which rotates along with the video disc 2 and which has a central portion 17 and portions 18 which extend at least substantially radially and near the ends thereof, transverse portions 19 for cooperating with both the inner wall 10 of the central opening of the video disc 2 and the inner wall 15 of the recess 14 in the turntable 12, for centering the video disc 2 on the turntable 12 in the case of an elastic axial movement of the central portion 17. The centering device also comprises displacement means, comprising the cover 4 of the video disc player, a pin 20, which is mounted in said cover with clearance, which pin is provided with a shoulder 21 and extends through an opening 22 in the cover, a helical spring 23 around the pin 20, as well as a cup spring 24 and a ball-bearing 25. (FIG. 3). The displacement means may further include a part of a member will be discussed in more detail later in the description.

The inner wall 10 of the central opening in the video disc is manufactured within comparatively tight tolerances by means of an accurate operation, such as for example a turning operation. In the case of a magnetic information disc with an aluminium carrier having an outer diameter of approximately 200 mm, the central opening may for example have a diameter of 63.5 mm with a tolerance of 80 microns. In the case of an optical information disc with two glass carriers having an outer diameter of approximately 300 mm, the central opening may have a diameter of 35 mm with a tolerance of 20 microns. The centering element 16 cooperates with the inner wall 10 of the central opening 9 in the information disc and also with the inner wall 15 of the central recess 14 in the turntable 12 via elastically deformable compensation means, for elastically compensating for differences in diameter through elastic radial deformation.

In the embodiment of the invention in accordance with FIGS. 1 to 7, the elastically deformable compensation means are interconnected and together constitute an elastically deformable compensation ring 27. This ring is connected to the information disc 2 and can thus be placed into and removed from the video disc player 1 together with said disc. The centering element 16 is connected to the elastically deformable compensation ring 27; together they belong to a centering member 28 connected to the video disc 2, which member forms part of a unit made of an elastic plastics, which unit also comprises the central portion 17. This unit constitutes a centering disc, which disc roughly has the shape of a diaphragm having an outer ring 29, a portion situated near the center comprising the central portion 17 and the portion 18, as well as a convolution 34, which connects the outer ring 29 to the portion situated nearer to the center. The outer ring 29 is situated on the upper side of the video disc 2 and the convolution projects through its central opening 9 to the other side and partly beyond it. On its outer circumference, the convolution tightly fits in the central opening 9 and the portion of the convolution which projects from the video disc functions as the previously mentioned elastically deformable compensation ring 27 of the centering disc.

The centering disc 28 is manufactured from a suitable elastic plastics, for example a polyamide. The centering disc 28 is not only suitable for use in conjunction with video discs, but may for example also be employed in conjunction with magnetic information discs for use in peripheral equipment for computers and other data processing systems. In the case of a magnetic information disc of approximately 20 cm diameter, an eccentricity of a track in the information layer of more than 20 microns is considered to be impermissible for specific applications. When a drive spindle 130 is used which is journalled in the housing of an electric motor 131 by means of a ball-bearing 132 and a suitable bearing on the other side, an eccentricity of the spindle of less than 10 microns cannot readily be realized, even if precision bearings are employed. This means that only a tolerance range of 10 microns is available for compensating for the eccentricity errors in respect of the location of the inner wall 15 of the turntable 12 and of the centering of the information disc on the turntable. However, it has been shown that rather surprisingly these requirements can be met with a comparatively simple plastics component such as the centering disc 28 because the elastic deformation of the compensation ring 27 provides a compensation for any local irregularities over the circumference of the centering disc. These irregularities, for example, may be surface unevenesses of the inner wall 15 and of the outer wall of the convolution 34 and those caused by the presence of dust particles and other extraneous particles.

How the video disc 2 is inserted, centered and retained will be described in particular with reference to FIGS. 3 to 6. In the position, shown in FIG. 3, of the turntable 12 relative to the member 26 of the pressure device, the space between them is such that the video disc together with the centering disc 28 can be inserted. The member 26 has a central portion 35 situated near the center, with a continuous groove 30 of triangular cross-section. The facing central portion 17 of the centering disc 28 is formed with an upright ring 31 of corresponding diameter. Thus, the member 26 and the centering disc 28 can cooperate with each other; the displacement means in the drive unit for axially moving the central portion 17 are centered thereon. On its circumference, the member 26 has an annular portion 32 which is coaxial with the said central portion 35. This annular portion 32 serves as a video disc loader. As will be explained hereinafter, the video disc 2 is pressed against the supporting surface 13 of the turntable 12.

Figure 4:
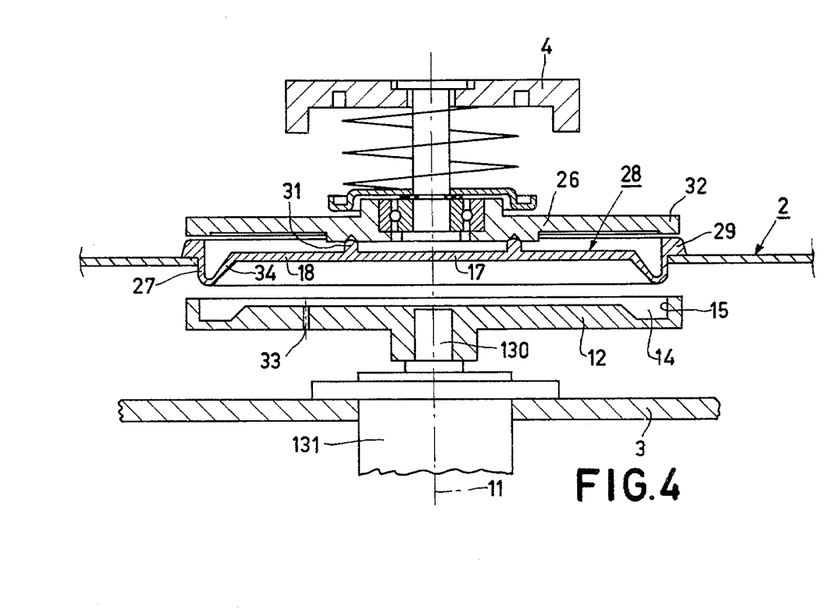
FIG. 4 is a cross-sectional view similar to that of FIG. 3, said member having been moved towards the disc over a certain distance and being in contact with a centering disc belonging to the information disc.
Figure 5:
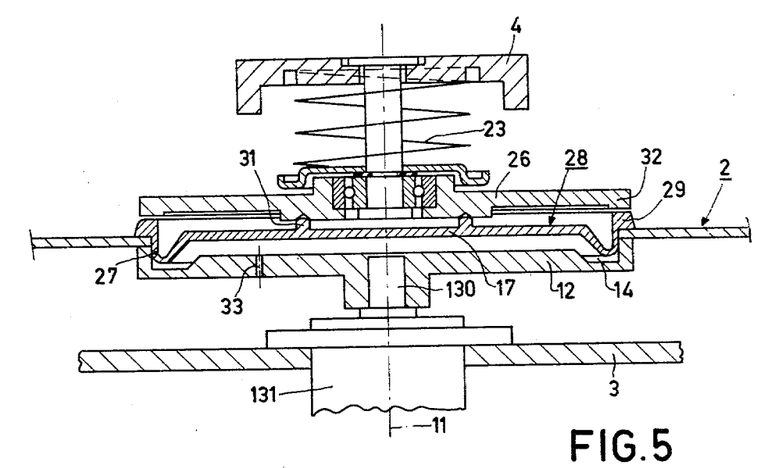
FIG. 5 is a cross-sectional view similar to that of FIG. 4, but now with the various parts in a mutual relationship in which the information disc is centered on the turntable.

In FIG. 4, the member 26 has been lowered by the movement of the cover 4 and now makes contact with the upright ring 31 of the centering disc 28. When the video disc 2, as is illustrated in FIG. 1, is manually placed on the turntable 12, the situation of FIG. 4 will normally not occur but the centering disc 28 will already have made contact with the turntable 12 before the cover is closed. In FIG. 5, the cover has further been closed so that the elastic compensation ring 27 engages with the recess 14 of the turntable and the compression spring 23 is just not compressed. It is possible, and likely after frequent use, that insertion of the centering disc into the turntable cannot be effected without exerting a certain effort. Because the elastic compensation ring 27 will then engage with the inner wall of the turntable over the entire circumference in a comparatively accurate manner, a vent opening 33 is formed in the turntable in order to avoid problems. The central portion 35 of the member 26 is situated so relative to the circumferential portion 32 which serves as information disc loader that, upon an axial displacement of the displacement means, first contact is made with the central portion 17 of the centering disc, as is shown in FIG. 5, and subsequently this central portion is axially moved, see FIG. 6. Thus, the video disc is centered. It is not until after this that the information disc loader 32 bears on the outer ring 29 of the centering disc 28 and the video disc is urged against the supporting surface 13 of the turntable 12 by the disc loader.

Figure 6:
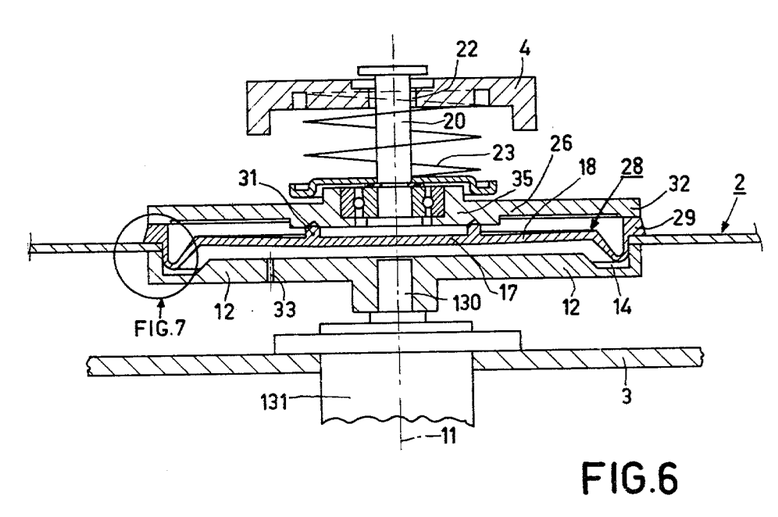
FIG. 6 is a cross-sectional view similar to that of FIG. 5, the information disc being pressed onto the turntable.

The turntable 12 makes direct contact with the underside of the video disc, so that said disc is directly supported thereby. In FIG. 6 the compression spring 23 is compressed, so that the pin 20 can rotate freely in the opening 22 in the cover 4 of the video disc player. The portion 18 of the centering disc 28 is now slightly elastically bent. This results in an elastic radial deformation of the convolution 34 of the centering disc; the elastic compensation portions 27 forming part of said convolution.

Figure 7:
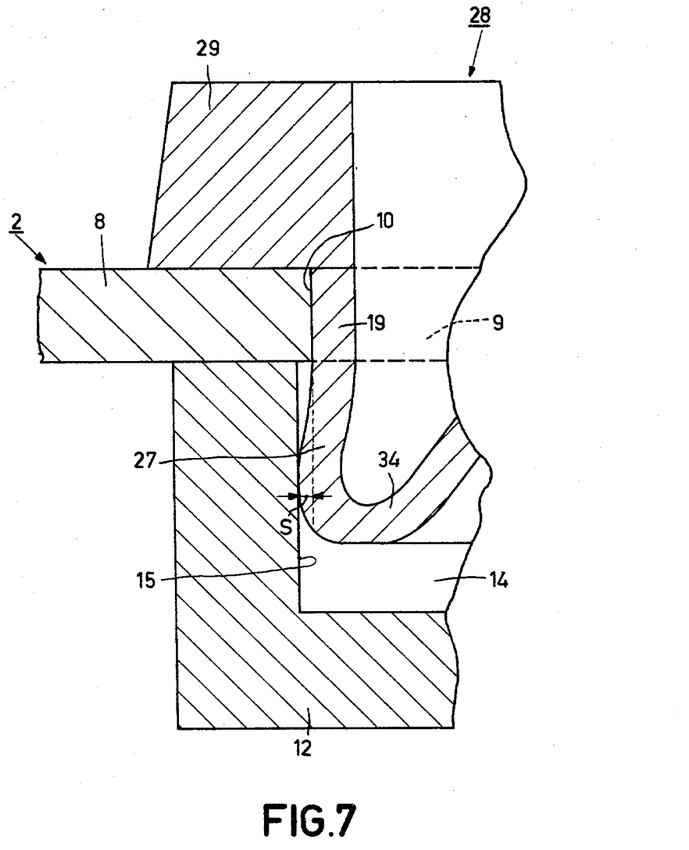
FIG. 7 is an enlarged detail of FIG. 6.

FIG. 7 relates in particular to this situation. In FIG. 7, it is assumed that the inner wall 10 of the central opening 9 of the video disc is situated at a slightly smaller diameter than the inner wall 15 of the recess 14 in the turntable. This results in a certain clearance between the two inner walls, which clearance has been exaggerated in FIG. 7 for the sake of clarity and is designated by the letter S. In reality it can easily be assured that the difference in diameter does not exceed some tens of microns when the central opening 9 in the video disc has a nominal diameter of 35 mm. This difference in diameter can readily be compensated for by the elastically deformable ring 27. In this respect it is of importance that by centrally loading the central portion 17 in the axial direction a uniform pressure is exerted in all directions, so that the dimension S will be substantially the same at all points along the circumference and the difference in diameter between the central opening 9 of the video disc and of the recess 14 of the turntable is uniformly distributed over the entire circumference. This uniformity may be disturbed by unevenesses but not to such an extent that this results in a contribution to the eccentricity equal to the height of the unevenness.

Figure 8:
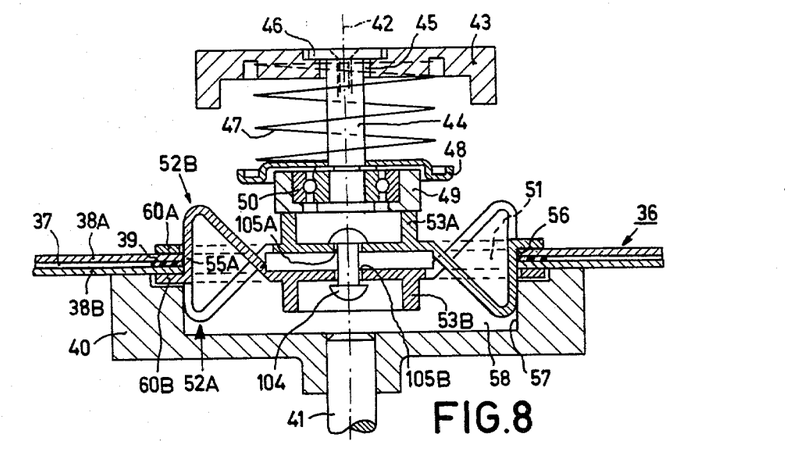
FIG. 8 is a cross-sectional view, similar to that of FIG. 3, of a different embodiment of the invention.

In the embodiments of the system in accordance with FIGS. 1 to 7, the information disc cannot be placed on the drive unit in a reversed position. However, FIG. 8 relates to an embodiment of the invention in which this is possible. The information disc 36 comprises a carrier consisting of two glass plates 38A and 38B which are spaced from each other by a gas-filled space 37. Between the plates a spacer 39 is interposed, another spacer being located nearer the circumference, not shown, of the information discs. The information layers of the information disc are not shown and are located on the glass plates 38A and 38B, namely on the side facing the gas-filled space 37. Such a disc has already been proposed by the Applicant as an optical storage disc for use in conjunction with data processing equipment (see U.S. Pat. No. 4,074,282, which is incorporated herein by reference). The information disc can be used in the position shown in FIG. 8, but can also be used with the glass plate 38A facing the turntable 40.

The turntable is mounted on a drive spindle 41 which, in a manner not shown, can be rotated about an axis of rotation 42 by a motor. The drive unit comprises a gear rack 43 which is movable in the direction of the axis of rotation 42, in which rack a pin 44 is loosely journalled, which pin projects through an opening 45 with clearance and is provided with a flange 46 at its upper end. These parts are similar to the corresponding parts in FIGS. 3 to 6. A compression spring 47 exerts pressure on a spring cup 48, which is located above a rotating member 49, by means of a ball-bearing 50 which is rotatably journalled on the pin 44.

Figure 9:
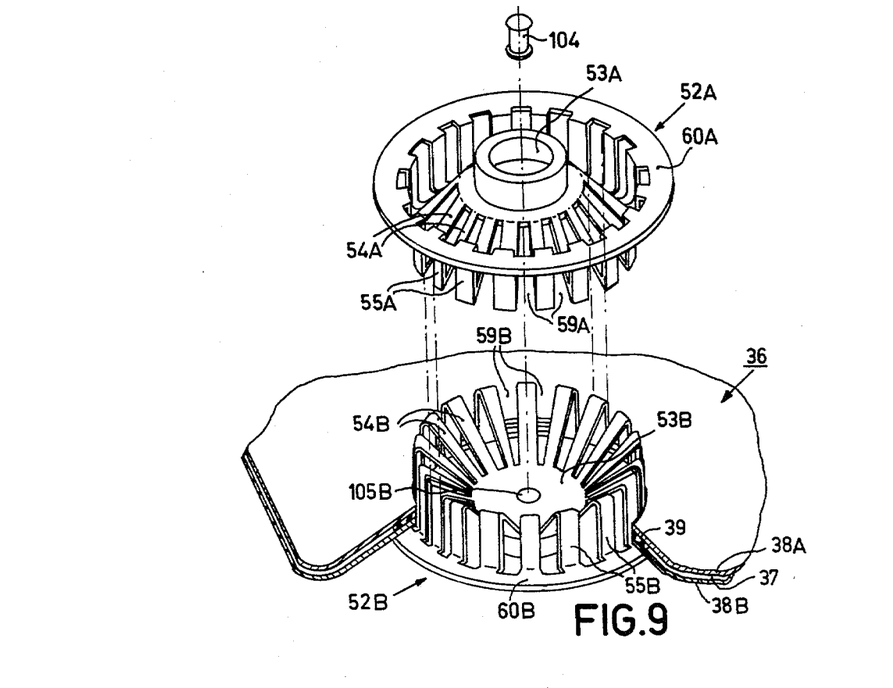
FIG. 9 is an exploded view of the two centering members and a coupling member of the embodiment of FIG. 8.

In the central opening 51 of the information disc 36, two centering elements 52A and 52B are disposed. Also see FIG. 9, which shows two centering elements in an exploded view. The centering elements have central portions 53A and 53B respectively, which are adapted to cooperate with the pressure member 49. Furthermore, there are provided elastic portions 54A and 54B respectively, which extend at least substantially radially. Near the ends of these portions there are disposed transverse portions 55A and 55B respectively, which cooperate both with the inner wall 56 of the central opening 51 of the information disc 36 and with the inner wall 57 of a recess 58 in the turntable 40. The bracket 43, together with the pin 44, the compression spring 47, the spring cup 48, the pressure member 49 and the ball-bearing 50, constitute the displacement means of the drive unit for axially moving one of the central portions 53A and 53B of the centering members. Between the radially extending portions 54A of the centering element 52A, slots 59A are formed. The centering element 52B is identical to the centering element 52A and thus has similar slots 59B. The slots 59A, B are slightly broader than the diametrically extending portions 54A, B, enabling the two centering elements 52A and 52B to be mounted opposite each other in the central opening 51 of the information disc 36 in the manner illustrated in FIGS. 8 and 9. The substantially radial portions of the one centering element then pass through the slots of the other centering element. The transverse portions 55A are interconnected by a flange 60A, the portions 55B by a flange 60B. Each of the centering elements 52A and 52B thus constitutes an integral unit. This unit, in a similar way as the centering disc in the previously described embodiment, is manufactured from a suitable elastic plastics.

The central portions 53A and B are coupled to each other by means of a coupling member 104. Said member takes the form of a plastics rivet which engages with clearance with openings 105A and 105B in the central portions 53A and B of the two centering elements. In the situation shown in FIG. 8, the central portion 53A is slightly offset in an axial direction, without thereby affecting the position of the central portion 53B of the other centering element 52B.

Figure 10:
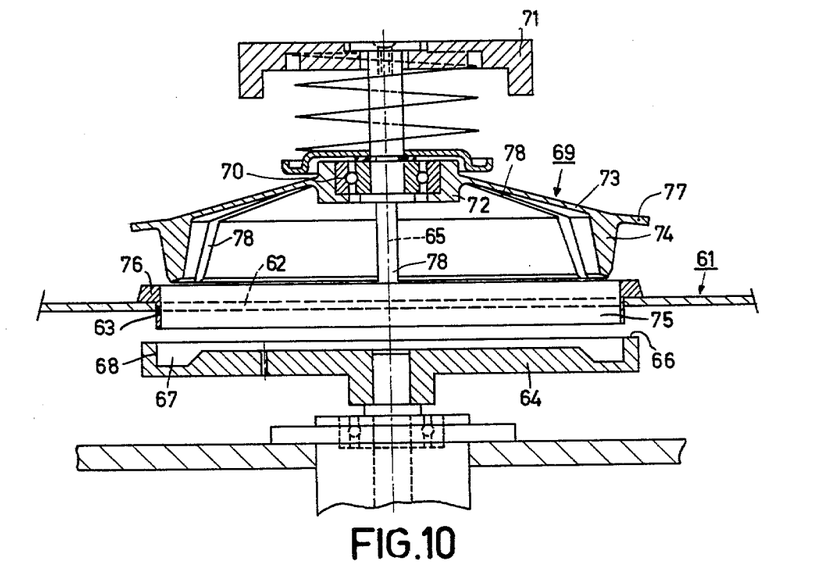
FIG. 10 is also a cross-sectional view similar to that of FIG. 3 of another embodiment of the invention, the various components being in such a relationship that an information disc can be placed onto or removed from the drive unit.

FIG. 10 relates to an embodiment of the invention which illustrates that it is not necessary that the centering element be physically connected to the information disc. An information disc 61 is shown having a central opening 62 which is defined by an inner wall 63, a turntable 64 which rotates about an axis of rotation 65 and has a supporting surface 66 in which a recess 67 is formed, which recess is defined by an inner wall 68 which is coaxial with the axis of rotation 65. On the drive unit there is disposed a centering element 69 which rotates along with the information disc 61 and which is connected to an axially movable bracket 71 of the drive unit by means of a ball-bearing 70. The element 69 has a central portion 72, elastic portions 73 which extend at least substantially radially and, near the ends thereof, transverse portions 74 for cooperation both with the inner wall 63 of the central opening 62 of the information disc 61 and with the inner wall 68 of the recess 67 of the turntable 64. The radially extending elastic portions 73 are spaced from each other by slots 78. Thus, in the case of an axial movement of the central portion 72, the six portions 73 are elastically deformable independently of each other. Because the displacement means for axially moving said central portion in the embodiment of FIG. 10 fully correspond to those shown in the previous FIGS. 1-6 and 8, the individual parts have not been numbered and are not discussed. The centering element 69 cooperates with the inner wall 62 of the information disc 61 and also with the inner wall 68 of the recess 67 in the turntable 64 via elastically deformable compensation means, which together form part of an elastically deformable compensation ring 75. On one side said ring is provided with a flange 76 and extends through the central opening 62 beyond the other side of the information disc 61.

Figure 11:
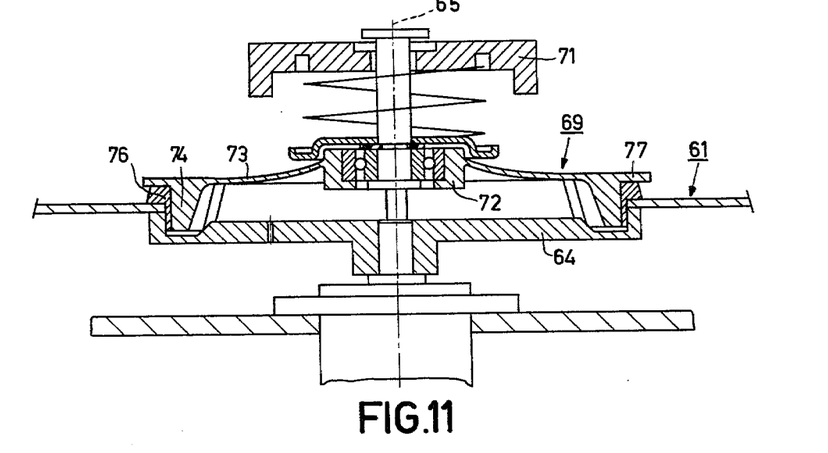
FIG. 11 is a cross-sectional view similar to that of FIG. 10, the various parts now being in such a relationship that the information disc is centered and clamped in position on the turntable.

FIG. 11 shows the situation wherein the information disc is centered on the turntable 64 and is axially urged against the supporting surface 66 of the turntable 64 by means of radially extending portions 77 of the transverse portions 74.

Figure 12:
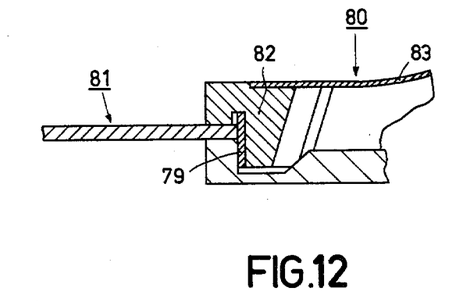
FIG. 12 is a detail of a cross-sectional view of a different embodiment of the invention.

FIG. 12 shows a detail of a system similar to that of FIGS. 10 and 11, in which an elastically deformable compensation ring 79 is mounted on the outer circumference of a centering element 80. In this embodiment, neither the elastically deformable compensation means for elastically compensating for differences in diameter through elastic radial deformation, nor any portions of the centering element are connected to the information disc 81. All these parts are connected to the drive unit. The transverse portions 82 of the centering element 80 are connected to the central portion, not shown, by metal radially extending elastic portions 83 made of a leaf-spring material. The transverse portions 82 can for example be manufactured from aluminium or a plastics and be connected to the leaf spring 83 by glueing. The elastic compensation ring 79 may, for example, be manufactured from rubber or a plastics with similar properties.

Figure 13:
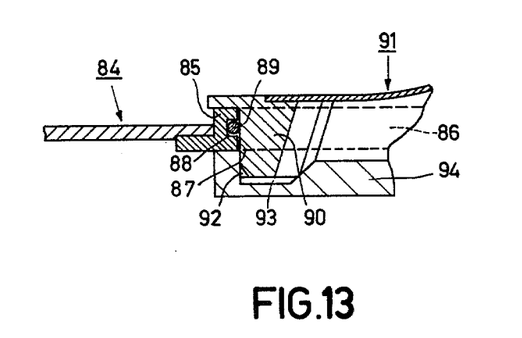
FIG. 13 also shows a detail of a cross-sectional view of still another embodiment of the invention, and FIG. 14 again is a detailed cross-sectional view of yet another embodiment of the invention.

In the embodiment of FIG. 13, the information disc 84 has been provided with a hub 85, in which the central opening 86 is formed. The inner wall 87 of the central opening comprises portions which define an annular space 88; the elastically deformable compensation ring 89, which in the embodiment shown is constituted by an O-ring, being accommodated in the annular space. In the radial direction the O-ring, at least as long as the information disc is not placed on a drive unit, extends radially inwards beyond the inner wall of the central opening. This is necessary because otherwise it cannot cooperate correctly with the transverse portion 90 of the centering element 91. Furthermore, in the embodiment shown, it will be necessary that the inner wall 92 of the recess 93 in the turntable 94 is situated at a slightly smaller diameter than the inner wall 87 of the hub 85. The transverse portions 90 of the element 91 will thus make contact with the inner wall 92 of the turntable 94. The difference in diameter between the inner wall 92 of the turntable and the inner wall 87 of the hub is compensated for by the elastically deformable O-ring 89.

Figure 14:
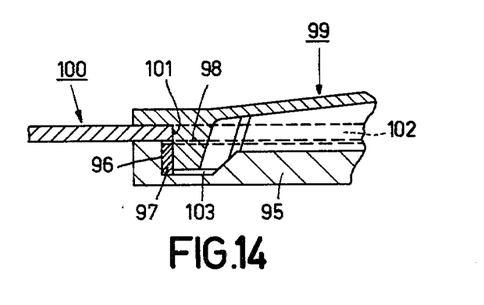

The embodiment of FIG. 14 relates to a case in which the elastic compensation means are arranged on the turntable. The turntable 94 comprises an elastic ring 97, which is placed against its inner wall 96, against which ring the transverse portion 98 of the centering element 99 presses. Thus, the information disc 100 is in direct contact via the transverse portions 98 with the inner wall 101 of its central opening 102. It will be evident that in the shown embodiment the inner diameter of the elastically deformable compensation ring 97 must be smaller than the diameter of the inner wall 101 of the information disc 100.

What is claimed is:

1. An arrangement for centering, and writing and/or reading information on, interchangeable information discs comprising a carrier having a central opening defined by an inner wall, said arrangement comprising:

a drive unit including a turntable rotatable about an axis of rotation, said turntable having a supporting surface on one end for an information disc, said supporting surface having a recess formed therein defined by an inner wall which is coaxial with the axis of rotation;

at least one said information disc;

a centering element arranged for rotation with said information disc when said disc is placed into the drive unit, said element including a central portion, elastic portions extending at least substantially radially and, near the ends of said elastic portions, transverse portions adapted for engagement both with the inner wall of the central opening of the information disc and the inner wall of the recess in the turntable, for centering the disc on the turntable upon elastic axial displacement of said central portion; and displacement means in the drive unit for axially displacing said central portion;

characterized in that said carrier is substantially rigid, said inner wall of the carrier has an accurate finish, and said arrangement includes integrally constructed elastically deformable compensation means for compensating for differences in diameter between said inner walls, said elastically deformable compensating means being biased radially outwardly to exert substantially uniform pressure throughout said inner walls in response to axial displacement of said central portion, said centering element engaging at least one of said inner walls via said elastically deformable means.

2. An arrangement as claimed in claim 1, characterized in that said arrangement includes an elastically deformable compensation ring, said elastically deformable compensation means being part of said ring.

3. An arrangement as claimed in claim 2, characterized in that said ring is connected to the turntable and is arranged against the inner wall of the central recess.

4. An arrangement as claimed in claim 2, characterized in that said ring is connected to the information disc, whereby the ring is placeable into and removable from the drive unit together with the disc.

5. An arrangement as claimed in claim 4, characterized in that the information disc includes a hub in which the central opening is formed; portions of the inner wall of the opening defining an annular space, said ring being arranged in said space and extending radially inwardly beyond the inner wall of the central opening at least when the information disc is not placed on the drive unit.

6. An arrangement as claimed in claim 4, characterized in that said centering element is connected to said ring.

7. An arrangement as claimed in claim 6, characterized in that said displacement means and said central portion of the centering element have mutually cooperating portions for centering the displacement means relative to said central portion, thereby centering the displacement means relative to the axis of rotation of the turntable.

8. An arrangement as claimed in claim 6, characterized in that said ring and said centering element together are formed as a unitary centering member made of an elastic plastic, connected to the information disc.

9. An arrangement as claimed in claim 8, characterized in that said centering member is a centering disc.

10. An arrangement as claimed in claim 9, wherein said centering disc is shaped substantially as a diaphragm having an outer ring, a portion situated nearer the center of the centering disc, and a convoluted portion connecting the outer ring to said portion nearer the center, the outer ring bearing on a side of the information disc and the convoluted portion extending through the central opening of the information disc and partly beyond the other side of the information disc, the outer circumference of the convoluted portion engaging the central opening of the disc, and the extending portion of the convoluted portion functioning as the elastically deformable ring of the centering disc.

11. An arrangement as claimed in claim 9, characterized in that that at least one of said centering disc and said turntable is formed with at least one vent hole for venting space inside said turntable recess when the information disc is in place.

12. An arrangement as claimed in claim 8, characterized in that the information disc has two centering elements, one on each side of the information disc, each of said centering elements having slots between its substantially radially extending portions, the substantially radially extending portions of one of said centering elements projecting through the slots of the other.

13. An arrangement as claimed in claim 12, comprising in addition a coupling element coupling the central portions of the two centering elements to each other.

14. An arrangement as claimed in claim 2, characterized in that the centering element forms part of and is connected to the drive unit, and that the elastically deformable compensation ring is arranged on the outer circumference of the centering element.

15. An arrangement as claimed in claim 1, characterized in that the turntable is arranged such that a disc placed into the drive unit makes direct contact with and is directly supported by the turntable.

16. An arrangement as claimed in claim 1, characterized in that the drive unit further includes an information disc loader for urging an information disc placed into the drive unit against the turntable, said displacement means being coaxially connected to said loader, said displacement means and said loader being disposed relative to each other in such a way that, upon axial displacement of the displacement means when an information disc is in place, the displacement means first makes contact with the central portion of the centering element, subsequently moves the element axially such that the information disc is centered, and that the loader then bears on the information disc to urge it against the turntable.

* * * * *